United States Patent [19]

Ohsawa et al.

[11] Patent Number: 5,223,353
[45] Date of Patent: Jun. 29, 1993

[54] SOLID ELECTROLYTE, ELECTROCHEMICAL DEVICE INCLUDING THE SAME AND METHOD OF FABRICATING THE SOLID ELECTROLYTE

[75] Inventors: Toshiyuki Ohsawa, Kawasaki; Toshiyuki Kabata, Machida; Okitoshi Kimura; Sachiko Kimura, both of Tokyo; Tetsuya Samura, Kusatsu, all of Japan

[73] Assignees: Ricoh Company, Ltd., Tokyo; Sanyo Chemical Industries, Ltd., Kyoto, both of Japan

[21] Appl. No.: 778,056

[22] PCT Filed: Mar. 16, 1991

[86] PCT No.: PCT/JP91/00362

§ 371 Date: Dec. 9, 1991

§ 102(e) Date: Dec. 9, 1991

[87] PCT Pub. No.: WO91/14294

PCT Pub. Date: Sep. 19, 1991

[30] Foreign Application Priority Data

Mar. 16, 1990 [JP] Japan .................................. 2-66028
Nov. 10, 1990 [JP] Japan ................................. 2-305409
Nov. 10, 1990 [JP] Japan ................................. 2-305410
Dec. 28, 1990 [JP] Japan ................................. 2-416981
Feb. 18, 1991 [JP] Japan ................................... 3-46145

[51] Int. Cl.[5] .............................................. H01M 6/18
[52] U.S. Cl. .................................. 429/192; 429/196; 429/33
[58] Field of Search ................. 429/192, 190, 30, 191, 429/33, 194, 196; 204/421

[56] References Cited

U.S. PATENT DOCUMENTS 4,537,826  8/1985  Miyamura et al. ................. 428/328

FOREIGN PATENT DOCUMENTS

543876   5/1983  Australia .
1211547  9/1986  Canada .
0098416  1/1984  European Pat. Off. .
59-3809  1/1984  Japan .

*Primary Examiner*—Anthony Skapars
*Attorney, Agent, or Firm*—Oblon, Spivak, McClelland, Maier & Neustadt

[57] ABSTRACT

A solid electrolyte with excellent ionic conductivity, which is composed of a viscoelastic material having a structure of a polymerized material and a non-aqueous electrolytic solution contained in the polymerized material, a chemical element containing the solid electrolyte, and a method of fabricating the solid electrolyte are described. This solid electrolyte contains the non-aqueous electrolytic solution in an amount of 200 wt. % or more of the polymer and has a modulus of elasticity of $10^2$ to $10^5$ dyne/cm$^2$, and an elongation of 20% or more.

14 Claims, 2 Drawing Sheets

SOLID ELECTROLYTE, ELECTROCHEMICAL DEVICE INCLUDING THE SAME AND METHOD OF FABRICATING THE SOLID ELECTROLYTE

FIELD OF THE INVENTION

This invention relates to a novel solid electrolyte, an electrochemical device including the solid electrolyte, and a method of producing the solid electrolyte.

BACKGROUND OF THE INVENTION

In the field of electrochemical devices including a an electrolyte, it is strongly desired that the electrolyte be solidified. Conventionally, an electrolytic solution is employed in batteries serving as electrochemical devices. Therefore, not only the leakage of the electrolytic solution, and the drying of the electrolytic solution within the battery due to the evaporation of the electrolytic solution occur, but also the partial drying of the separator due to the imbalanced presence of the electrolytic solution in the battery cell causes an increase in the internal impedance or an internal short circuit in the battery. Furthermore, in the field of solid electrolytes for use in a display element for electrochromic devices, a solid electrolyte which sufficiently satisfies the requirement for the operational speed has never been obtained. As countermeasures for solving these problems, the use of polymeric solid electrolytes has been proposed. Specific examples of such polymer electrolytes are solid solutions of matrix polymers containing oxyethylene chains or oxypropylene chains, and inorganic salts. These are complete solids and have excellent machining properties. However, the ionic conductivities thereof are $10^{-5}$ S/cm at room temperature, which are about 3 orders less than those of ordinary non-aqueous electrolytic solutions. As a method of improving the low ionic conductivity, the use of a polymer solid electrolyte film with a thickness in the order of microns has been proposed. However, it is difficult to control the thickness of the micron-order thick polymer solid electrolyte film in such a manner that the electric field in the battery cell is kept constant. The reliability of the battery cell obtained is therefore low.

In order to improved the ionic conductivity of a polymer solid electrolyte, a method of making a polymer solid electrolyte semi-solid by dissolving the same in an organic electrolytic solution (Japanese Laid-Open Patent Application 54-104541) and a method of polymerizing a liquid monomer with the addition of an electrolyte to produce a cross-linked polymer including the electrolyte (Japanese Laid-Open Patent Application 63-94501) have been proposed. However, the former method has the problem that the obtained solid electrolyte does not have sufficient solid strength, and the latter method has the problem that the ionic conductivity of the obtained cross-linked polymer including the electrolyte is not satisfactory.

The present invention solves the above-mentioned problems of the conventional polymer-based solid electrolytes, and provides a polymer-based solid electrolyte which not only has excellent ionic conductivity, but also excellent uniformity, and has a sufficient solid strength for use as a solid electrolyte for electrochemical devices, and a method of fabricating the solid electrolyte having such particular properties.

DISCLOSURE OF THE INVENTION

This invention provides the following:

(1) A solid electrolyte characterized in that it is a viscoelastic material composed of a non-aqueous electrolytic solution and a polymerized material, and the content of the non-aqueous electrolytic solution is 200 wt. % or more of the polymerized material.

(2) A solid electrolyte characterized in that it is a viscoelastic material composed of a non-aqueous electrolytic solution and a polymerized material, the content of the nonaqueous electrolytic solution is 200 wt. % or more of the polymerized material, and the modulus of elasticity of the viscoelastic material is $10^2$ to $10^5$ dyne/cm$^2$ and the elongation is 20% or more.

(3) A solid electrolyte characterized in that it is a viscoelastic material composed of a non-aqueous electrolytic solution which comprises an electrolytic salt and a nonaqueous solvent, and a polymer of an acrylate having a molecular weight of less than 500, represented by the following formula (I) or a polymer of an unsaturated carboxylic acid ester comprising as the main component the acrylate, the content of the non-aqueous electrolytic solution is 200 wt. % or more of the polymer, and the content of the electrolytic salt in the non-aqueous electrolytic solution is 1.0 mol/l or more:

wherein $R_1$ represents a hydrogen atom, or a methyl group, $R_2$ represents a hydrocarbon group or a group containing a heterocyclic ring, and n is an integer of 1 or more.

(4) A solid electrolyte characterized in that it is a viscoelastic material composed of a non-aqueous electrolytic solution which comprises an electrolytic salt and a nonaqueous solvent, and a polymer of a compound represented by the following formula (II) or a polymer of an unsaturated carboxylic acid ester comprising as the main component the compound, the content of the non-aqueous electrolytic solution is 200 wt. % or more of the polymer, and the content of the electrolyte salt in the non-aqueous electrolytic solution is 1.0 mol/l or more:

wherein $R_3$ represents a hydrogen atom, or a methyl group, and $R_4$ represents a group containing a heterocyclic ring.

(5) An electrochemical device including any of the above solid electrolytes.

6) A method of fabricating a solid electrolyte characterized by the steps of dissolving 100 parts by weight of any of the above-mentioned compounds with formula (I) or the formula (II) or an unsaturated carboxylic acid ester comprising as the main component any of the above compounds in 200 parts by weight or more of a non-aqueous electrolytic solution with the concentration of the electrolyte being 1.0 mole/l or more, in the presence of a polymerization initiator, to polymerize the above to produce a viscoelastic polymer.

The solid electrolyte of the present invention is composed of a viscoelastic material comprising a polymer and a non-aqueous electrolytic solution, which is uniform in its entirety.

The viscoelastic solid electrolyte of the present invention has the properties of high ionic conductivity, low elasticity, low glass transition temperature (Tg), high stability to high temperatures, easy machining, low creep characteristics, and adhesiveness, and has both excellent liquid holding performance and shape-retention properties although it contains a large amount of an electrolytic solution. The solid electrolyte of the present invention normally has an ionic conductivity of $10^{-4}$ to $10^{-2}$ S/cm at 25° C. when measured by an A.C. impedance method. This conductivity is largely effected by the conductivity of the non-aqueous electrolytic solution which is one component of the solid electrolyte, but does not exceed the above value and is scarcely decreased by the solidification of the electrolyte. The elasticity of the solid electrolyte of the present invention, measured by a dynamic viscoelasticity testing machine (Trademark "RDS-7700" made by Rheometric Inc.), is normally $10^6$ dyne/cm$^2$ or less, preferably $10^2$ to $10^5$ dyne/cm$^2$, and more preferably $10^3$ to $10^5$ dyne/cm$^2$. The glass transition temperature of the solid electrolyte of the present invention is $-30°$ C. or less, and the elongation thereof is 20% or more. The solid electrolyte has a recovery power to a maximum of about 400% draw deformation without breaking. Furthermore, it does not break when folded 180 degrees.

The measurement of the deformation with time of the solid electrolyte of the present invention by use of a creep meter (Trademark "RR-3305" commercially available from Sanden Co., Ltd.) with a plunger cross section area of 2 cm$^2$ and a load of 30 g indicated that the solid electrolyte has low creep characteristics with no deformation against time. Even if the solid electrolyte of the present invention is pressed by the creep meter with application of a load of 25 g/cm$^2$ thereto, the electrolytic solution contained therein does not leak out. Furthermore, this viscoelastic material exhibits high adhesiveness, so that when these viscoelastic materials are applied to each other, neither be peeled away from the applied surface without being broken.

The solid electrolyte of the present invention can be formed by subjecting polymerizable materials to a polymerization reaction in a non-aqueous electrolytic solution. The polymerizable materials used here exhibit not only thermal polymerizability, but also polymerizability by light and active light rays such as ultraviolet rays, electron rays, gamma rays, and X-rays.

The polymerizable materials for use in the present invention contain in their molecules hetero atoms other than carbon atoms, such as oxygen, nitrogen and sulfur atoms. In the solid electrolytes (viscoelastic materials) obtained by dissolving the polymerizable materials containing these hetero atoms in a non-aqueous electrolytic solution and polymerizing the same, the hetero atoms other than carbon atoms are also considered to have the functions of promoting the ionization of the electrolytic salt employed, improving the ionic conductivity of the solid electrolyte, and increasing the strength of the solid electrolyte.

There is no particular restriction in the choice of the kinds of the polymerizable materials used in the present invention. Materials which can be polymerized by thermal polymerization and active light rays can also be used, but materials which exhibit photopolymerization by application of active light rays are preferable. Examples of thermal polymerization include an urethane-bond forming reaction and polymerizations in which an epoxy group or an acrylate group is involved. Of these reactions, the urethane-bond forming reaction is preferable. Examples of the photo-polymerization reactions by application of active light rays include polymerization using unsaturated carboxylic acid esters, polyene/polythiol mixtures and cross-linking macromers such as organic silanes and polyisothianaphthene. Of these, the polymerization reactions using unsaturated carboxylic acid esters or polyene/polythiol mixtures are preferable in the present invention.

The polymerization reaction of unsaturated carboxylic acid esters, the polymerization reaction of the mixtures of polyene/polythiol, and the polyurethane-forming reaction, which are excellent as the polymerization reactions in an electrolytic solution, will now be explained in detail.

In the present specification, the term "(meth)acrylate" means acrylate or methacrylate, and the term "(meth)acryloyle group" means acryloyle group or methacryloyle group.

As the polymerization reaction in a non-aqueous electrolytic solution in order to obtain the solid electrolyte of the present invention, photopolymerization by use of active light rays, which is a low-temperature process, is preferable in order to avoid the thermal decomposition of the solid electrolyte to be obtained. Examples of the photopolymerizable materials with application of active light rays include (meth)acrylate, and a combination of polyene and polythiol. Examples of the (meth)acrylate include monofunctional and polyfunctional (meth)acrylates. Examples of the monofunctional acrylates are alkyl (meth)acrylates such as methyl (meth)acrylate, butyl (meth)acrylate, and trifluoroethyl (meth)acrylate; alicyclic (meth)acrylates such as tetrahydrofurufuryl (meth)acrylate; hydroxyalkyl (meth)acrylates such as hydroxyethyl acrylate and hydroxypropyl acrylate; hydroxypolyoxyalkylene (meth)acrylates (preferably the oxylenealkyl group having 1 to 4 carbon atoms) such as hydroxypolyoxyethylene (meth)acrylate and hydroxypolyoxypropylene (meth)acrylate; and alkoxy (meth)acrylates (preferably the alkoxy group having 1 to 4 carbon atoms) such as methoxyethyl acrylate, ethoxyethyl acrylate, and phenoxyethyl acrylate. Preferable examples of the polyfunctional (meth)acrylates are, of the photopolymerizable monomers and photopolymerizable prepolymers described on pages 142–152 of "UV, EB Curing Technology" published by Sogo Gijutsu Center Co., Ltd., the three or more functional monomers and prepolymers such as trimethylolpropane tri(meth)acrylate, pentaerythritol (meth)acrylate, and dipentaerythritol hexa(meth)acrylate.

Of the above acrylates, the acrylates represented by the following formula (I), having a molecular weight of less than 500, and the acrylates represented by the following formula (II) are particularly preferable:

wherein $R_1$ represents a hydrogen atom, or a methyl group, $R_2$ represents a hydrocarbon group or a group containing a heterocyclic ring, and n is an integer of 1 or more.

wherein $R_3$ represents a hydrogen atom, or a methyl group, and $R_4$ represents a group containing a heterocyclic ring.

In the above formula (I), $R_2$ represents a hydrocarbon group or a group containing a heterocyclic ring. Examples of the hydrocarbon group include aliphatic groups and aromatic groups. Examples of the aliphatic hydrocarbon groups are those having 1 to 10 carbon atoms, such as methyl, ethyl, propyl, butyl, hexyl and octyl groups, preferably aliphatic hydrocarbon groups having 1 to 5 carbon atoms. Examples of the aromatic hydrocarbon groups are phenyl, tolyl, xylyl, naphthyl, benzyl, and phenethyl groups. Examples of the group containing a heterocyclic ring include a variety of heterocyclic rings including hetero atoms such as oxygen, nitrogen, and sulfur. Examples of such groups include furfuryl group and tetrahydrofurfuryl group. Specific examples of the acrylate represented by formula (I) include alkylethylene glycol acrylates such as methylethylene glycol acrylate, ethylethylene glycol acrylate, propylethylene glycol acrylate, and phenylethylene glycol acrylate; alkylpropylene glycol acrylates such as ethylpropylene glycol acrylate and butylpropylene glycol acrylate; alkylene glycol acrylates including a heterocyclic ring such as furfurylethylene glycol acrylate, tetrahydrofurfurylethylene glycol acrylate, furfurylpropylene glycol acrylate, and tetrahydrofurfurylpropylene glycol acrylate.

The acrylates represented by formula (I) have a molecular weight of less than 500, but those having a molecular weight of 300 or less are preferable. In the case of acrylates having a molecular weight of 500 or more, the non-aqueous solvent easily oozes out of the solid electrolyte obtained therefrom.

There is no particular restriction in the choice of the heterocyclic ring contained in the meth)acrylates represented by formula (II). Examples of the groups containing such a heterocyclic ring are the residues of heterocyclic rings containing hetero atoms such as oxygen, nitrogen or sulfur. Examples of the (meth)acrylates represented by formula (II) include furfuryl (meth)acrylate, and tetrahydrofurfuryl (meth)acrylate. Of these, furfuryl acrylate and tetrahydrofurfuryl acrylate are preferable for use.

The compounds represented by formula (I) or formula (II) can be used alone or by combining two or more of those compounds.

By use of the compound represented by formula (I) or formula (II) in combination with a polyfunctional unsaturated carboxylic acid ester, a solid electrolyte which ideally has both excellent elasticity and ionic conductivity can be obtained. Examples of such a polyfunctional unsaturated carboxylic acid ester are those having two more (meth)acryloyl groups. Preferable examples of the polyfunctional the polyfunctional unsaturated carboxylic acid ester are, of the photo-polymerizable monomers and photo-polymerizable prepolymers described on pages 142-152 of "UV, EB Curing Technology" published by Sogo Gijutsu Center Co., Ltd., the two or more functional monomers and prepolymers such as diethylene diglycol di(meth)acrylate, butanediol di(meth)acrylate, trimethylolpropane tri(meth)acrylate, and dipentaerythritol hexa(meth)acrylate. Of these, three-functional (meth)acrylates are most preferable in view of the fact that they provide solid electrolytes which have excellent liquid retaining performance, ionic conductivity and strength.

The usable amount of the compounds represented by formula (I) or formula (II), or of the unsaturated carboxylic acid ester comprising as the main component any of the above compounds is 50 wt. % or less, preferably in the range of 5 to 40 wt. %, more preferably in the range of 10 to 30 wt. %, with respect to the amount of the non-aqueous electrolytic solution. When the amount is more than 50 wt. %, the ionic conductivity and strength of the solid electrolyte are decreased.

In the case where the compound of formula (I) or formula (II) is used in combination with the polyfunctional unsaturated carboxylic acid ester the amount of the polyfunctional unsaturated carboxylic acid ester is 4 wt. % or less, preferably in the range of 0.05 to 2 wt. % with respect to the non-aqueous electrolytic solution. In particular, when a three-functional unsaturated carboxylic acid ester is employed in combination with the compound of formula (I) or formula (II), a solid electrolyte with excellent ionic conductivity and strength can be obtained by use of as small an amount of the three-functional unsaturated carboxylic acid ester as 2 wt. % or less, more preferably in the range of 0.05 to 0.5 wt. % with respect to the nonaqueous electrolytic solution. Thus, by the combined use of such polyfunctional unsaturated carboxylic acid esters, solid electrolytes with better ionic conductivity and strength can be obtained. However when too much of the polyfunctional unsaturated carboxylic acid esters is used in combination, the solid electrolytes obtained do not exhibit viscoelasticity, and lack flexibility, and cracks tend to be easily formed upon application of an external force thereto.

Examples of polymerization initiators for polymerizing the compounds represented by formula (I) or formula (II), and the unsaturated carboxylic acid esters comprising as the main component any of the above compounds include: carbonyl compounds, for example, benzoin compounds such as benzoin, benzoin methyl ether, benzoin ethyl ether, benzoin propyl ether, benzoin isobutyl ether, α-methyl benzoin, and α-phenyl benzoin; anthraquinone compounds such as anthraquinone, methylanthraquinone, chloroanthraquinone; other compounds such as benzil, diacetyl, acetophenone, benzophenone, and methylbenzoylfomate; sulfides such as diphenylsulfide and dithiocarbamate; halides of polycondensation cyclic hydrocarbons such as α-chloromethyl naphthalene; dyes such as acryl fravin, and fluorecein; metal salts such as iron chloride and silver chloride; and onium salts such as p-methoxybenzene diazonium, hexafluorophosphate, and diphenyliodonium. These polymerization initiators can be used alone or in the form of a mixture of two or more. Photopolymerization initiators preferable for use in the present invention are the carbonyl compounds, the sulfides and the onium salts. When necessary, thermal polymerization initiators such as azobisisobutyronitrile, benzoyl peroxide, lauroyl peroxide, and ethyl methyl ketone peroxide can be used in combination with the above polymerization initiators. Furthermore, polymerization initiators such as dimethylaniline, cobalt naphthenate, sulfinic acid, and mercaputan can also be employed in combination with the above polymerization initiators. Furthermore, sensitizers and preservation stabilizing agents can also be employed in combination with the above polymerization initiators when necessary. Specific examples of the sensitizers are, of the sensitizers described on pages 158 to 1569 of "UV, EB Curing Technology" published by Sogo Gijutsu Center Co., Ltd., urea, nitrile compounds such as N,N-disubstituted-p-aminobenznitrile; and phosphorus compounds such as tri-n-butylphosphine. Specific examples of the preservation stabilizing agents are, of the preservation stabilizing agents described on pages 158 to 1569 of "UV, EB Curing Technology" published by Sogo Gijutsu Center Co., Ltd., tertiary ammonium chloride, benzothiazole, and hydroquinone.

The amount of the polymerization initiators employed is normally in the range of 0.1 to 10 wt. %, preferably in the range of 0.5 to 7 wt. %, with respect to the amount of the entire unsaturated carboxylic acid esters employed. When the amount of the polymerization initiators exceeds the above normal range, an appropriate reactivity cannot be obtained. The amounts of each of the sensitizer and the preservation stabilizing agent are normally in the range of 0.1 to 5 parts by weight to 100 parts by weight of the entire unsaturated carboxylic acid esters employed.

The solidification of the electrolytic solution in the present invention can be performed by injecting into a sealed container the non-aqueous electrolytic solution containing the previously mentioned compound of formula (I) or formula (II) or the unsaturated carboxylic acid ester comprising as the main component the above compound of formula (I) or formula (II), or by coating the non-aqueous electrolytic solution on a support, for instance, made of a film, metal or glass, followed by polymerizing the nonaqueous electrolytic solution with application of heat or active light rays. As the active light rays, normally light, ultraviolet rays, electron rays and X-rays can be employed. Of these active light rays, those having a main wavelength in the range of 100 to 800 nm are preferable for use in the present invention. The solidified electrolytic solution, that is, the solid electrolyte, can be worked into a product in the form of a film or a sheet, or in a composite form in combination with a part of an electrochemical device.

As the electrolytic solution, either an aqueous electrolytic solution or a non-aqueous electrolytic solution can be used, but a non-aqueous electrolytic solution is preferable for use in the present invention. The solid electrolyte of the present invention exhibits excellent performance, when used in a battery containing a non-aqueous electrolytic solution such as a lithium battery, in the place of the non-aqueous electrolytic solution. As an example of a non-aqueous electrolytic solution to be solidified, one in which an electrolytic salt is dissolved in a non-aqueous electrolytic solution can be given. There is no particular restriction in the choice of the electrolytic salt so long as ordinary non-aqueous electrolytic solutions are employed. Specific examples of the electrolytic salt include $LiClO_4$, $LiBF_4$, $LiAsF_6$, $LiPF_6$, $LiCF_3SO_3$, $LiCF_3COO$, $NaClO_4$, $NaBF_4$, $NaSCN$, $KBF_4$, $Mg(ClO_4)_2$, $Mg(BF_4)_2$. When used in batteries, electrolytic salts having low molecular weights are preferable.

Examples of the non-aqueous solvent include propylene carbonate, γ-butyrolactone, ethylene carbonate, sulfolane, dioxolane, tetrahydrofuran, 2-methyl tetrahydrofuran, dimethyl sulfoxide, 1,2-dimethoxyethane, 1,2-ethoxyethane, and glimes such as methyl diglime, methyl triglime, methyl tetraglime, ethyl glime, ethyl diglime, and butyl diglime. Of these, the combinations of the glimes, and propylene carbonate, and/or γ-butyrolactone are preferable in view of the ionic conductivity and the solubility of the electrolytic salts.

The concentration of the electrolytic salt in a nonaqueous electrolytic solution is normally in the range of 1.0 to 7.0 moles/l, and preferably in the range of 2.0 to 5.0 moles/l. When the concentration is less than 1.0 mole/l, a solid electrolyte having sufficient strength cannot be obtained. When the concentration of the electrolytic salt exceeds 7.0 moles/l dissolving the electrolytic salt becomes difficult. The amount of the non-aqueous electrolytic solution is normally 200 wt. % or more, preferably in the range of 400 to 900 wt. %, more preferably in the range of 500 to 800 wt. % of a polymer which constitutes a matrix. When the amount of the non-aqueous electrolytic solution is less than 200 wt. %, a sufficiently high ionic conductivity cannot be obtained, while when the amount exceeds 900 wt. %, the solidification of the non-aqueous electrolytic solution becomes difficult.

In order to obtain the solid electrolyte of the present invention, it is necessary to adjust the concentrations of the electrolytic salt and the unsaturated carboxylic acid ester in the non-aqueous electrolytic solution to appropriate concentrations. Thus, there is a close relationship between the concentration of the electrolytic salt and that of the unsaturated carboxylic acid ester. When the concentration of the electrolytic salt is close to 1.0 mole/l which is the minimum concentration, the concentration of the entire unsaturated carboxylic acid esters must be in the range of about 20–50 wt. % to produce a solid electrolyte having satisfactory characteristics, while when the concentration of the electrolytic salt is as high as 3 moles/l or more, the concentration of the entire unsaturated carboxylic acid esters may be in the range of about 10–20 wt. % in order to obtain a satisfactory solid electrolyte.

SPECIFIC EXPLANATION OF THE INVENTION

Figure 1:
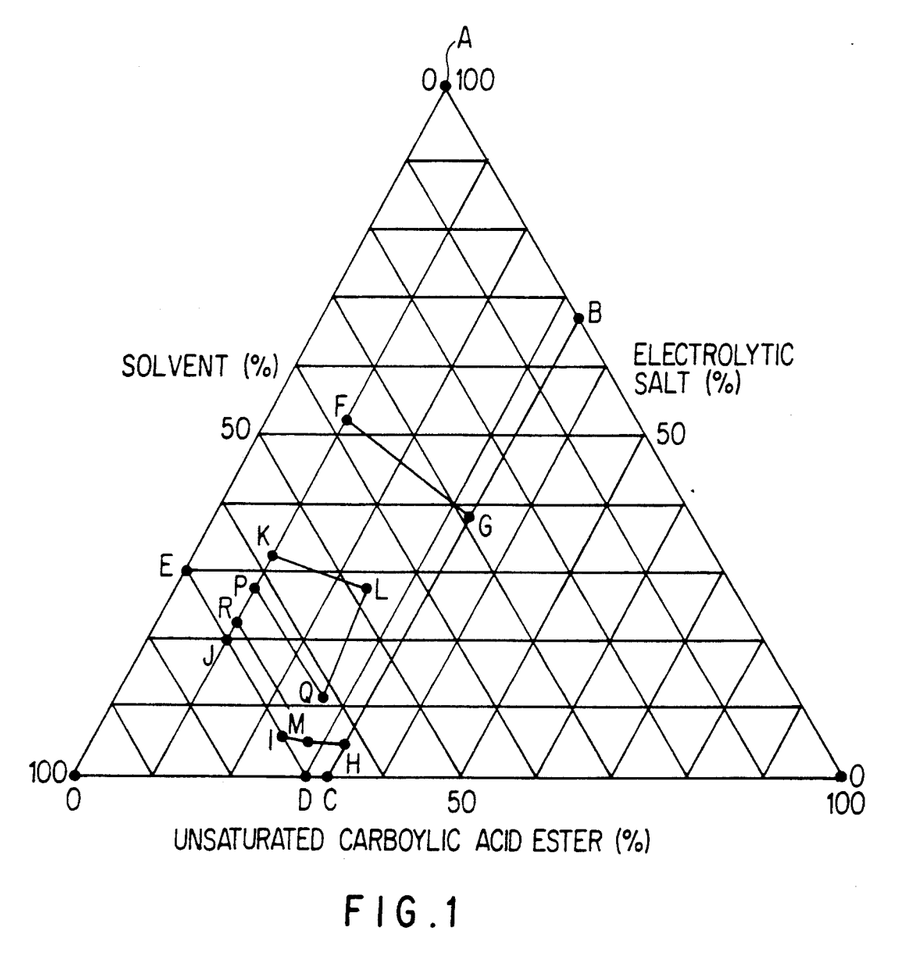
FIG.1 is a diagram showing the preferable composition ranges of a solvent, an electrolytic salt and an unsaturated carboxylic acid ester which constitute the solid electrolyte of the present invention.

FIG.1 shows the composition ranges of a solvent, an electrolytic salt and an unsaturated carboxylic acid ester which constitute a solid electrolyte obtained by using an unsaturated carboxylic acid ester which contains a compound represented by general formula (I). In FIG.1, the area enclosed with A, B, C, D, E and A shows a preferable composition area, the area enclosed with K, L, M, I, J, and K shows a more preferable area, and the area enclosed with R, M, I, J, and R shows a particularly preferable area, in which a solid electrolyte which is most suitable in both elasticity and ionic conductivity.

The compositions of the unsaturated carboxylic acid ester, the electrolytic salt and the solvent at each point in FIG.1 are as follows:

A: (0, 100, 0)
B: (33, 67, 0)
C: (33, 0, 67)
D: (30, 0, 70)
E: (0, 30, 70)
F: (10, 52, 38)

G: (33, 38, 29)
H: (33, 5, 62)
I: (24, 6, 70)
J: (10, 20, 70)
K: (10, 32, 58)
L: (24, 28, 48)
M: (28, 5, 67)
P: (10, 28, 62)
Q: (27, 11, 62)
R: (10, 23, 67)

The polymerization reaction of a mixture of polyene and polythiol fundamentally proceeds in accordance with the following formulas:

$$RSH \longrightarrow RS\cdot + H\cdot$$

$$RS\cdot + CH_2=CH-CH_2R' \longrightarrow RS-CH_2-CH-CH_2R'$$

$$RSH \longrightarrow RS-CH_2-CH_2-CH_2R' + RS\cdot$$

wherein R and R' each represent an organic group such as an alkyl group.

Examples of the polyene are polyallyl ether compounds and polyallyl ester compounds. Examples of the polyallyl ether compounds are compounds prepared by addition of an epoxy compound such as ethylene oxide, propylene oxide, butylene oxide, styrene oxide, cyclohexene oxide, epihalohydrin, allyl glycidyl ether to a saturated or unsaturated allyl alcohol. Of these compounds, those obtained by addition of ethylene oxide or propylene oxide to a saturated or unsaturated ally alcohol are preferable.

Examples of the polyallyl ester compounds are reaction products of allyl alcohol or the above-mentioned polyallyl ether compounds and a carboxylic acid. Examples of the carboxylic acid include aliphatic, alicyclic and aromatic mono- and poly-carboxylic acids, for example, monocarboxylic acids such as acetic acid, propionic acid, butyric acid, octanoic acid, lauric acid, stearic acid, oleic acid and benzoic acid (with 1 to 20 carbon atoms); and dicarboxylic acids such as adipic acid and phthalic acid. Of these compounds, the reaction products of the polyallyl ether compounds and polycarboxylic acids are preferable.

Examples of polythiol include a liquid polysulfide; aliphatic, alicyclic and aromatic polythiol compounds; and mercaptocarboxylic acid esters. As an example of the liquid polysufide, Thiokol LP Series (Toray Thiokol Co., Ltd.) can be given. Of these polythiols, those having an average molecular weight of 400 or less are preferable. Examples of the aliphatic, alicyclic and aromatic polythiol compounds include methane (di)thiol, and ethane (di)thiol. Examples of the mercaptocarboxylic acid esters include compounds obtained by the esterification reaction of a mercaptocarboxylic acid and a polyhydric alcohol or by the ester exchange reaction of a mercaptocarboxylic acid alkyl ester and a polyhydric alcohol. As examples of the mercaptocarboxylic acid, 2-mercaptoacetic acid and 3-mercaptopropionic acid can be given. As examples of the polyhydric alcohol, ethylene glycol, trimethylol propane, glycerol, pentaerythritol, sucrose, and alkylene oxide adducts of these compounds such as ethylene oxide adducts, propylene oxide adducts, and butylene oxide adducts. Preferable polyhydric alcohols are those having 3 or more hydroxyl groups, which do not contain alkylene oxide adducts. Examples of the mercaptocarboxylic acid alkyl ester include 2-mercaptoethyl acetate, and 3-mercaptomethyl propionate. Preferable polythiols are the liquid polysufide and mercaptocarboxylic acid esters.

As the polymerization initiators for the reaction mixture of the polyene and polythiol, the same polymerization initiators as employed for the polymerization of the unsaturated carboxylic acid esters can be used.

Examples of compounds which are thermal polymerizable include a combination of a polyisocyanate which forms polyurethane, a polyol and/or a cross-linking agent, and prepolymers prepared by the same combination. As the polyol, those described on pages 99–117 of "Handbook of Polyurethane Resins" (published by Nikkan Kogyo Shinbun Co., Ltd.) can be given. Of the polyols described therein, polyoxyalkylene polyols having a melting point of 10° C. or less which are formed by polymerizing alkylene oxides such as ethylene oxide, propylene oxide and tetrahydrofuran are preferable. In this case, there may be one or more alkylene groups in the polyoxyalkylene polyols. Of the above polyoxyalkylene polyols, a polyoxyalkylene polyol prepared by copolymerizing ethylene oxide and propylene oxide is particularly preferable. The polyoxyalkylene polyol may be a mixture of two or more polyoxyalkylene polyols. The melting point of the polyoxyalkylene polyols is normally 10° C. or less, preferably in the range of 0° C. to −60° C. When the melting point exceeds 10° C., the ionic conductivity of the solid electrolyte decreases because of the crystallizing properties. The hydroxyl number of the polyoxyalkylene polyol is normally 84 or less, and preferably 60 or less. When the hydroxyl number exceeds 84, the ionic conductivity of the solid electrolyte decreases. Preferable polyisocyanates are tolylene diisocyante, 4,4'-metaphenylene diisocyanate, isophorone diisocyanate, and prepolymers of these diisocyanates, out of the polyisocyanates described on pages 90 to 98 of the previously cited reference. The content ratio of the NCO group is normally 48 wt. % or less, preferably 40 wt. % or less. When the NCO group content ratio exceeds 48 wt. %, the ionic conductivity of the solid electrolyte decreases. As the cross-linking agent, polyhydric alcohols and polyfunctinal amines as well as water, out of the cross-linking agents described on pages 122–123 of the previously cited reference, can be employed. Of these cross-linking agents, polyhydric alcohols such as ethylene glycol are preferable. The polyol and/or the cross-linking agent and the polyisocyanate provide a polyurethane by polyaddition reaction, when necessary in the presence of a catalyst. In this case, catalysts which are conventionally used in the synthesis of polyurethane can be given as such a catalyst. Specific examples of such catalysts are triethylene diamine and stannous octoate.

As an electrolytic solution employed for forming a solid electrolyte using a reaction of the polyene/polythiol mixture and a urethane-forming reaction, the same electrolytic solutions as employed when a solid electrolyte is formed by the polymerization reaction of the unsaturated carboxylic acid esters can be given.

It is preferable that a dipping auxiliary, which decreases the surface tension of a non-aqueous electrolytic solution and improves the penetration of the non-aqueous electrolytic solution into a separator film or active materials be added to a non-aqueous electrolytic solution which is employed to obtain the solid electrolyte of the present invention. Examples of such a dipping auxiliary are silicone derivatives such as silicone oil and siliconealkylene oxide adducts; polypropylene oxide derivatives; perfluoroalkylsulfonic acid salts; fluorine derivatives such as perfluoroalkyl quaternary ammonium iodides, perfluoroalkyl polyoxyethylene ethanol, and fluorinated alkyl esters. The amount of such a dipping auxiliary employed is normally in the range of 0.1 to 10 wt. % and preferably in the range of 0.5 to 5 wt. % in the solid electrolyte. When the amount of the dipping auxiliary exceed the range of 0.1 to 10 wt. %, an economical dipping effect cannot be obtained.

The solid electrolyte of the present invention is preferably fabricated in an atmosphere of inert gas. In this case, a solid electrolyte with better ionic conductivity and strength can be obtained in comparison with a solid electrolyte produced in air.

The solid electrolyte of the present invention can be used as a layer of solid electrolyte in electrochemical devices such as batteries, condensers, electrochromic devices and semi-conductor devices. The case where the solid electrolye of the present invention is used as an electrolyte for batteries will now be explained.

Generally, a battery is composed of a positive electrode comprising an active material, a negative electrode comprising an active material, a separator, and an electrolyte. An unconventially excellent battery can be obtained when the solid electrolyte of the present invention is used as the elecrolyte in such a battery. When the solid electrolyte of the present invention is employed in the battery, it is also possible to assign the function of a separator to the solid electrolyte so that the solid electrolye works as the electrolyte and a separator as well. In order to make uniform the electric field between the anode and the cathode, thereby improving the reliability of the battery obtained, it is preferable to integrate the electrolyte and the separator. In particular, such a configuration is necessary in the case of a secondary battery. In the present invention, the integration of the separtor and the solid electrolyte is easily accomplished by directly forming the solid electrolyte in a battery cell having a separator, or by penetrating a solid- electrolyte-forming composition into the separator and polymerizing the same. In this case, it is preferable that a dipping auxiliary be added to the solid-electrolyte- forming composition.

Examples of active materials for the positive electrode in the battery include chalcogenite compounds such as $TiS_2$, $Nb_3S_4$, $MoS_2$, $CoS_2$, $FeS_2$, $V_2O_5$, $Cr_2O_5$, $MnO_2$ and $CoO_2$; and electro-active polymers, for example, electroconductive polymers such as polyaniline, polypyrrole, poly-3-methyl-thiophene, polydiphenylbenzidine, and polyazulene, and metalocene polymer. Of these anode-electric active materials, the electroactive polymers are preferable, and the electroconductive polymers are more preferable.

Examples of cathode-active materials include metals such as Li, Na, K, Ag, Cu and Zn; alloys such as alloys of Li with Al, Mg, Pb, Si, Mn, Ga or In; electroconductive polymers such as polyacetylene, polythiophene, polyparaphenylene, polypyridine, polyacene, graphite and electrochemically active carbons. Of these cathode-active materials, lithium, lithium alloys, and electroconductive polymers are preferable. When an electroconductive polymer is employed in the active materials for the positive and/or negative electrode, it is necessary to dissolve an electrolytic salt in the electrolytic solution in an amount greater than the doping amount thereof, therefore a solid electrolyte in which the concentration of the electrolytic salt is high and the content of the electrolytic solution is large is obtained.

In the present invention, a separator which exhibits low resistance to the movement of ions and has excellent liquid-holding properties is employed. Examples of such a separator are a glass fiber filter; polymer-based pore filters and non-woven fabrics made of a polymer such as polyester, teflon, polyethylene, or polypropylene; a paper-like sheet made from glass fiber and polymer fiber. A composite material comprising a non-woven fabric made of polypropylene with micro pores with a diameter of 0.1 to 0.01 μm and a solid electrolyte is particularly advantageous over other separators in terms of performance.

A battery of the present invention can be produced by using a viscoelastic material comprising a polymer and a non-aqueous electric solution in place of a solid electrolyte employed in conventional batteries. The solid electrolyte of the present invention can be formed by polymerizing a polymerizable material, which is dissolved in a non-aqueous electric solution, and converting the reaction liquid into a viscoelastic material with high flexibility. Therefore it is preferable that the formation be carried out by direct polymerization on an electrode or on a separator, or within an electric cell. More specifically, it is preferable that battery elements such as electrodes and a separator be impregnated with a solid electrolyte formation composition, and the solid electrolyte formation composition be made a viscoelastic material by polymerization means such as heating or application of active light rays thereto, so that the formed solid electrolyte and the battery elements are integrated. Each battery element and the solid electrolyte may be integrated with respect to each battery element, but such integration can be applied to the combination of a positive electrode and a separator, the combination of a negative electrode and a separator, and the combination of a positive electrode, a negative electrode and a separator. When the battery elements and the solid electrolyte are integrated in this manner, the reaction at the positive and negative electrodes and the ion transfer can be caused to proceed smoothly, so that the inner resistance of the battery can be significantly reduced.

The solid electrolyte of the present invention exhibits preferable characteristics when it is used in a composite form with an electroconductive polymer. This is because a monomer solution penetrates a polymer before the polymerization of the monomer solution to swell the polymer, and then sufficiently penetrates the polymer, and thereafter the monomer solution is solidified by polymerization, so that no specific interfaces are formed between the the solid electrolyte and the polymer, resulting in a reduction of the interface resistance between the two. In the case of conventional solid electrolytes, represented by a solid electrolyte of the type comprising a polymer matrix and an inorganic salt, containing dissociated ionic groups, polarization easily takes place in the interface between the solid electrolyte and an active material, so that there is a large interface resistance between them. In contrast to this, the solid electrolyte of the present invention has liquid-like properties but is in the form of a solid as mentioned previously. Therefore, positive ions and negative ions move easily within the solid electrolyte in the same manner as in conventional electrolyte solutions, so that little of the above-mentioned polarization takes place in a battery in which an electroconductive polymer is used. Therefore it can be said that the combination of the solid electrolyte of the present invention and the electroconductive polymer is a preferable one.

The composition of an electroconductive polymer and the solid electrolyte of the present invention is generally carried out by impregnating the electroconductive polymer with a solid electrolyte formation composition, followed by converting the composition to a viscoelastic material by means of polymerization as mentioned previously.

In the present invention, for example, the following can be used as the electroconductive polymer: polymers of heterocyclic five-membered ring compounds prepared from a monomer such as pyrrole or thiophene; polymers of aromatic hydrocarbon compounds prepared from a monomer such as benzene or azulene; polymers of amine compounds prepared from a monomer such as aniline and diphenylbenzene; polyarylenevinylene which is useful as the covering material of a negative electrode; and unsaturated aliphatic polymers prepared from monomers such as halogen-substituted compounds of unsaturated hydrocarbons such as ethylene, butadiene, and hexatriene. These monomers can be polymerized by chemical polymerization by using oxidizing agents or by electrochemical polymerization by using electric energy.

The chemical polymerization can be carried out by adding an oxidizing agent to a solution containing a monomer and oxidizing the monomer. Examples of the oxidizing agent are halogens such as iodine, bromine, and iodobromide; metal halogenides such as arsenic pentafluoride, antimony pentafluoride, silicon fluoride, and phosphorus pentachloride; protonic acids such as sulfuric acid, nitric acid, fluorosulfuric acid, and chlorosulfuric acid; oxygen-containing compounds such as sulfur trioxide, nitrogen dioxide, potassium dichromate, potassium permaganate; persulfates such as sodium persulfate, potassium persulfate, and ammonium persulfate; and peroxides such as hydrogen peroxide, peracetic acid, and difluorosulfonyl peroxide. Polymers with a high degree of polymerization obtained by chemical polymerization are insoluble in solvents and obtained in the form of a powder. In the case of a powder-like active material, regardless of whether it is an inorganic material or an organic material, the methods of composing an active material and an electrolytic solution can be roughly classified into two methods. The first method is to solidify an electrolytic solution in an active material which serves as a framework material. The second method is to form a composite material of an active material and an electrolytic solution and solidify the composite material. In the case where the first method is applied to a powder-like electroconductive polymer synthesized by chemical polymerization, the powder-like electroconductive polymer is formed into a desired shape for the electrode, such as a pellet- or sheet-shape, and the appropriately shaped polymer is impregnated with a solid electrolyte forming composition, followed by composing the electroconductive polymer and the solid electrolyte by means of polymerization with the application of heat or active light rays thereto. When the second method is applied, an appropriate amount of the solid electrolyte formation composition is added to the powder-like electroconductive polymer, the polymer is sufficiently impregnated with the solid electrolyte formation composition, the two components are mixed to prepare a paste-like mixture, and the paste-like mixture is formed into the desired shape and composed by means of polymerization with the application of heat or active light rays thereto. Either in the first method or in the second method, when necessary, other additives, for example, an electroconductive material such as acetylene black, ketjen black, and graphite, can be added to the above components. In the present invention, since the solid electrolyte serves as a binder agent as well, it is unnecessary to use a binder agent such as teflon.

In the case where an electrode is prepared by use of the above-mentioned paste-like mixture, any shape can be made. However, when the electrode is in the shape of a pellet, the paste-like mixture is formed into a pellet, or firmly applied to a porous carbon member or a foamed metal member to work it into a pellet. When preparing a sheet-shaped electrode, the paste-like mixture is firmly applied to or coated on a sheet-shaped material such as a blast-treated punching metal, a metal mesh, an expand metal and a carbon fiber fabric.

Syntheses of electroconductive polymers by electrochemical polymerization are described, for instance, in J. Electrochem. Soc., Vol.130. No. 7. 1506–1509(1983), Electrochem. Acta., Vol.27. No. 61–85(1982), J.Chem.-Soc., Chem.Commun., 1199– (1984). This polymerization can be carried out by placing a solution of a monomer and an electrolyte dissolved in a solvent in an appropriate electrolytic chamber, immersing the electrodes, and subjecting the reaction mixture to anode-oxidation or cathode-oxidation. Examples of such an electrolyte are electrolytes with anions such as $BF_4^-$, $AsF_6^-$, $SbF_6^-$, $PF_6^-$, $ClO_4^-$, $HSO_4^-$, $SO_4^{2-}$, and aromatic sulfonic acid anions, and cations such as hydrogen ion, quaternary ammonium cation, lithium, sodium and potassium cations, although the electrolytes are not particularly limited to these electrolytes. Examples of the solvent are water, acetonitrile, benzonitrile, propylene carbonate, $\gamma$-butyrolactone, dichloromethane, dioxane, dimethylformamide, and nitro compound solvents such as nitromethane, nitroethane, nitropropane, and nitrobenzene, although the solvents are not particularly limited to these solvents. For the electrochemical polymerization, constant-voltage electrochemical polymerization, constant-current electrochemical polymerization and constant-potential electrochemical polymerization are possible. In the electrochemical polymerization, a sheet-shaped electrode can be formed substantially in one stage by using a sheet-shaped electroconductive member as a reaction electrode. Therefore, the electrochemical polymerization is essentially suitable for the fabrication of a sheet-shaped electrode. In composing a polymer prepared by the electrochemical polymerization and the solid electrolyte of the present invention, when the electroconductive polymer is utilized by recovering the same in the form of powder, the previously mentioned first and second methods are employed. However, when an electrode, on which an electroconductive polymer obtained by the electrochemical polymerization is deposited, is used as is, the composition is possible by sufficiently impregnating the electroconductive polymer on the electrode with a solid electrolyte forming composition and then by conducting the polymerization.

In order to improve the energy capacity of an electrode comprising such an electroconductive polymer, it is also possible to compose the electrode with the addition of an inorganic active material. Examples of such an active material include chalcogenite compounds such as $TiS_2$, $Nb_3S_4$, $MoS_2$, $CoS_2$, $FeS_2$, $V_2O_5$, $Cr_2O_5$, $MnO_2$, $CoO_2$ and $WO_3$. For composing such powder-like chalcognite compounds, any of the compounds is added to a composition system of the previously mentioned powder-like electroconductive polymer and the solid electrolyte, or the powder-like electroconductive polymer is dispersed in the above system at the time of electrochemical polymerization, and incorporated into the electroconductive polymer. The methods of composing the active material consisting essentially of the electroconductive polymer and the solid electrolyte, and the method of fabricating the electrode with the composite solid electrolyte. The composition of an alkali metal which serves as an active material for the negative electrode, in particular, lithium or a lithium alloy, and the solid electrolyte, the composition of a powder-like (or particle-shaped) active material such as Li-Al, Li-Mg, Li-Pb, Li-Al-Mg or Li-Al-Mn and the solid electrolyte and the fabrication of an electrode with a composite solid electrolyte can be carried out by the same procedure as in the composition of the powder-like electroconductive polymer and the solid electrolyte. The composition of the solid electrolyte and a sheet-shaped metal active material can be performed by uniformly coating a solid electrolyte forming composition on the surface of the sheet-shaped metal active material and forming a solid electrolyte on the surface thereof by means of polymerization with application of heat or active light rays. Such compositions are of course important for the reduction of the interface resistance, but by securely forming the solid electrolyte on the interface of a metal active material for a negative electrode, such as Li or a Li-Al-based alloy, for the composition, the formation of a moss-shaped lithium or a dendrite can be prevented, and the destruction of the Li-Al-based alloys can be suppressed. This leads to the improvement of the charge-discharge efficiency of the negative electrode, and the extension of battery cycle life. Thus, this composition is extremely important. From the view point of the improvement of the charge-discharge efficiency of the negative electrode, it is possible to solidify an electrolytic solution to be solidified, with the addition of various additives which contribute to the improvement of the charge-discharge efficiency. Examples of such additives are organic materials such as benzene, crown ethers including 12-crown-4, 15-crown 5; and hetero-atom-containing 5-membered ring compounds, 2-methyfuran, 2,5-dimethylfuran, 2-methylthiophene, 2,5-dimethylthiophene, and 4-methylthiazole. Inorganic additives can also be employed. Examples of such inorganic additives are compositions comprising metal ions such as Mg(II) and Fe(III). Specific examples are $Mg(Cl_4)_2$, $MgCl_2$, $Fe(ClO_4)_2$, and $FeCl_3$. Generally the addition amount of such additives is approximately in the order of ppm to 1 mol/l, although the most effect amount varies depending upon the kind of the additive.

According to the present invention, a battery can be fabricated by integrally composing a positive electrode, a negative electrode, a solid electrolyte with a separator interposed therebetween to form a layered type battery, or by winding the integral composite in a spiral shape to form a coin type battery, a cylindrical battery, a square battery, a thin plate type battery, and a sheet-shaped battery, suitable for each battery cartridge.

The present invention will now be explained in more detail with reference to the following examples. The present invention is not limited to these examples. Hereinafter, the terms "part(s)" and "%" respectively mean "parts by weight" and "wt. %".

The solid electrolyte forming compositions employed in the examples and comparative examples were as follows. Each non-aqueous solvent and each electrolytic salt were sufficiently purified, with the content of water reduced to 20 ppm or less, followed by the elimination of oxygen and nitrogen therefrom, with the purity grades thereof being set for use in batteries. Experiments were all conducted in an atmosphere of argon. The measurement of ionic conductivity was conducted at 25° C.

The measurement of the ionic conductivity of each solid electrolyte was conducted by two methods. Specifically, in the first method, the measurement was conducted by filling a solid electrolyte in a cylindrical container made of SUS with an inner diameter of 20 mm, which constitutes a counter electrode, and placing a cylinder made of SUS with a diameter of 5 mm, with the outer peripheral surfaces thereof being connected through teflon, which serves as a work electrode, in pressure contact with the surface of the solid electrolyte. The values of the ionic conductivity obtained by this method are shown with a mark (*). In the second method, the measurement was conducted by filling a solid electrolyte in a cylindrical container made of SUS with an inner diameter of 20 mm, with the inner peripheral surface except the inner bottom surface thereof being covered with an insulating tape, which constitutes a counter electrode, and placing a cylinder made of SUS with a diameter of 18 mm, which serves as a work electrode, in pressure contact with the surface of the solid electrolyte. The values of the ionic conductivity obtained by this method are shown with a mark (**).

Solid electrolyte forming composition (I)

In a non-aqueous solvent consisting of a mixture of propylene carbonate and 1,2-dimethoxy ethane with a weight ratio of 6:4, $LiBF_4$ is dissolved with a ratio of 3 moles/l to prepare an electrolytic solution. This solid electrolyte forming composition is a mixture of 79.2% of the above electrolytic solution, 19.5% of ethoxydiethylene glycol acrylate, 0.8% of methyl benzoylformate, and 0.5% of a silicone-alkylene oxide adduct.

Solid electrolyte forming composition (II)

In a non-aqueous solvent consisting of a mixture of propylene carbonate, γ-butyrolactone, and 1,2-dimethoxy ethane with a weight ratio of 7:1:2, $LiBF_4$ is dissolved with a ratio of 3 moles/l to prepare an electrolytic solution. This solid electrolyte forming composition is a mixture of 68.8% of the above electrolytic solution, 29% of ethoxydiethylene glycol acrylate, 1.2% of benzoine isopropyl ether, and 1.0% of a silicone-alkylene oxide adduct.

Solid electrolyte forming composition (III)

In a non-aqueous solvent consisting of a mixture of propylene carbonate, and 1,2-dimethoxy ethane with a weight ratio of 7:3, $LiBF_4$ is dissolved with a ratio of 3 moles/l to prepare an electrolytic solution. This solid electrolyte forming composition is a mixture of 85.8% of the above electrolytic solution, 12.8% of ethoxydiethylene glycol acrylate, 0.2% of trimethylolpropane triacrylate, 0.5 methylbenzoylformate, and 0.7% of a silicone-alkylene oxide adduct.

Solid electrolyte forming composition (IV)

In a non-aqueous solvent consisting of a mixture of propylene carbonate, and 1,2-dimethoxy ethane with a weight ratio of 6:4, LiBF$_4$ is dissolved with a ratio of 3 moles/l to prepare an electrolytic solution. This solid electrolyte forming composition is a mixture of 79.2% of the above electrolytic solution, 19.5% of furfuryl acrylate, 0.8% of methylbenzoylformate, and 0.5% of a silicone-alkylene oxide adduct.

Solid electrolyte forming composition (V)

In a non-aqueous solvent consisting of a mixture of propylene carbonate, -butyrolactone, and 1,2-diethoxy ethane with a weight ratio of 7:1:2, LiBF$_4$ is dissolved with a ratio of 3 moles/l to prepare an electrolytic solution. This solid electrolyte forming composition is a mixture of 68.8% of the above electrolytic solution, 30% of tetrahydrofurfuryl acrylate, and 1.2% of benzoine isopropyl ether.

EXAMPLE 1

Figure 2:
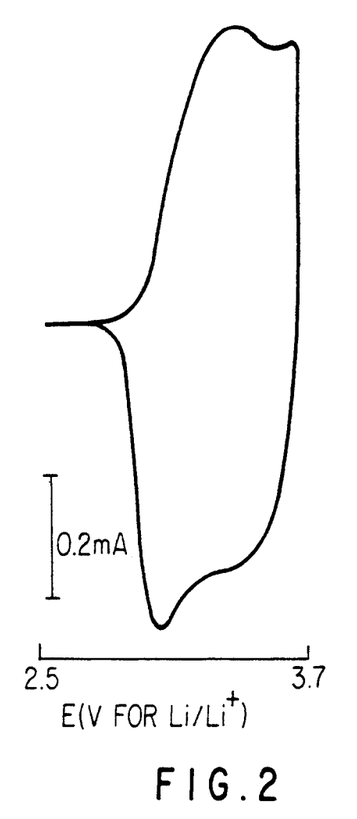
FIG.2 is a voltammogram of a polyaniline obtained in Example 1 of the present invention.

0.5 moles of aniline was dissolved in 1000 parts of a 5.5N aqueous solution of H$_2$SO$_4$. By use of this solution, a polyaniline thin film was formed on a Nesa glass (1 cm×2 cm) with a surface resistance of 4Ω/□ with a constant potential of 0.8 V vs SCE and a charge quantity of 0.02 C/cm$^2$. The thus obtained polyaniline thin film was subjected to a predetermined reduction treatment to convert the same to a completely reduced polyaniline thin film. The polyaniline thin film was sufficiently dried to prepare a polyaniline electrode. By use of lithium for a counter electrode and for a reference electrode, together with the above electrode, a beaker type cell was fabricated. The solid electrolyte forming composition (II) was placed in this cell and irradiated with active light rays by use of a fluorescent lamp for 8 hours. The composition was completely solidified in a viscoelastic form, without fluidity, and was integrated with the electrode with remarkable adhesion. With the polyaniline electrode being used as a working electrode, the cyclic voltammetry was measured with a potential sweep rate of 25 mV/sec. As a result, a voltammogram as shown in FIG. 2 was obtained. From the voltammogram, it was confirmed that the solid electrolyte exhibits the same excellent doping characteristics as in an electrolytic solution. The ionic conductivity of the solid electrolyte was 1.5×10$^{-3}$ S/cm*, and 1.0×10$^{-3}$ S/cm**.

EXAMPLE 2

0.5 moles of aniline was dissolved in 1000 parts of a 5.5N aqueous solution of H By use of this solution, a polyaniline thin film was formed on a Nesa glass (1 cm×2 cm) with a surface resistance of 4Ω/□ with a constant potential of 0.8 V vs SCE and a charge quantity of 0.04 C/cm$^2$. The thus obtained polyaniline thin film was subjected to a predetermined reduction treatment to convert the same to a completely reduced polyaniline thin film. The polyaniline thin film was sufficiently dried to prepare a polyaniline electrode. By use of lithium for a counter electrode and for a reference electrode, together with the above electrode, a beaker-shaped cell was fabricated. The solid electrolyte forming composition (III) was placed in this cell and irradiated with active light rays by use of a high pressure mercury arc lamp for 1.5 hours. The composition was completely solidified in a viscoelastic form, without fluidity, and was integrated with the electrode with remarkable adhesion. With the polyaniline electrode being used as a work electrode, the doping amount of the polyanine was measured. The results were 118 mAh/g at 25° C., 108 mAh/g at 0° C., and 103 mAh/g at −20° C., so that it was confirmed that excellent doping characteristics can be obtained in a relatively low temperature range. The ionic conductivity of the solid electrolyte was 4×10$^{-3}$ S/cm*, and 2.7×10$^{-3}$ S/cm**.

EXAMPLE 3

Polyaniline was synthesized in accordance with the method described in A.G. MacDiarmid et al., Conducting Polymers., 105 1987) using ammonium persulfate and hydrochloric acid. The synthesized polyaniline was sufficiently subjected to a reduction treatment, so that white powder-like polyaniline was obtained. 75 parts of the white powder-like polyaniline and 25 parts of acetylene black were kneaded. By pressure forming, the kneaded mixture was formed into a disc-shaped positive electrode with a diameter of 14.5 mm and a thickness of 0.6 mm. This positive electrode was sufficiently impregnated with the solid electrolyte forming composition (I), held between a pair of glass substrates and irradiated by active light rays by a high pressure mercury arc lamp, so that the solid electrolyte forming composition was solidified. A separator (Trademark "Juragurd 2502" made by Polyscience Co., Ltd.) was also sufficiently impregnated with the composition (I) in the same manner as mentioned above, held between a pair of glass substrates and irradiated by active light rays by a high pressure mercury acr lamp, so that the composition was solidified. As a negative electrode, a 0.1 mm thick lithium was employed. The above-mentioned positive electrode, the separator and the negative electrode were overlaid, whereby a coin type battery (CR2016 type) was fabricated.

EXAMPLE 4

A polyaniline film with a thickness of 0.1 mm was deposited on one side of a 0.02 mm thick, surface-roughened punching metal made of SUS by a constant-current electrochemical polymerization using an aqueous solution containing 1 mol/l of aniline and 3 mol/l of HBF$_4$, with a constant current of 3 mA/cm$^2$. The thus obtained polyaniline film was subjected to a reduction treatment and sufficiently dried in vacuum. The film was then applied to an external material of a PET-/aluminum/polypropylene layered composite film. The polyaniline film was sufficiently impregnated with the solid electrolyte forming composition (I), held between a pair of glass substrates with the application of a pressure of 1 kg, and irradiated with active light rays by a high pressure mercury arc lamp, whereby a sheet-shaped positive electrode composed of a composite film of the positive electrode and a solid electrolyte was obtained. A separator ("Tonen Tapyrus P010SW-000) was placed on this sheet-shaped positive electrode, sufficiently impregnated with the solid electrolyte forming composition (I), held between a pair of glass substrates, and irradiated with active light rays by a high pressure mercury arc lamp to solidify the composition. Apart from the above, a negative electrode prepared by applying a 0.1 mm thick lithium to a 0.02 mm SUS substrate was applied to an external material of a PET-/aluminum/polypropylene layered composite film. The solid electrolyte forming composition (I) was coated on the lithium, held between a pair of glass substrates, and irradiated with active light rays by a high pressure mercury arc lamp to solidify the composition, whereby the negative electrode and the solid electrolyte were composed. The above-mentioned positive electrode, the separator, and the negative electrode were overlaid to prepare a layered composite film. The peripheral portion of the layered composite film was heat sealed, whereby a sheet-shaped battery with a size of 4 cm×5 cm was fabricated.

EXAMPLE 5

Figure 3:
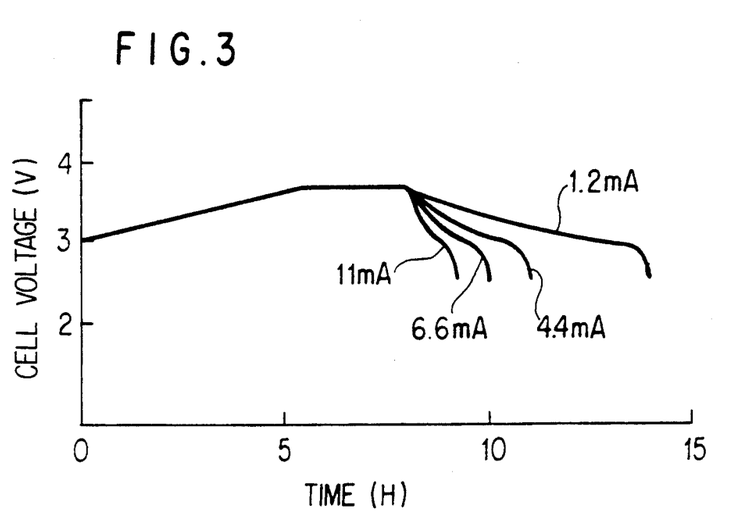
FIG.3 shows the charging-discharge curves of a battery obtained in Example 5 of the present invention.

A polyaniline film was deposited in an amount of 5 mg/cm$^2$ on one side of a 0.02 mm thick, surface-roughened punching metal made of SUS by a constant-current electrochemical polymerization using an aqueous solution containing 1 mol/l of aniline and 3 mol/l of HBF$_4$, with a constant current of 3 mA/cm$^2$. The thus obtained polyaniline film was subjected to a reduction treatment and sufficiently dried in vacuum. The film was then applied to an external material of a PET-/aluminum/polypropylene layered composite film. The polyaniline film was sufficiently impregnated with the solid electrolyte forming composition (III), held between a pair of glass substrates with the application of a pressure of 1 kg, and irradiated with active light rays by a high pressure mercury arc lamp, whereby a sheet-shaped positive electrode composed of a composite film of the positive electrode and a solid electrolyte was obtained. A separator ("Cell Guard 4501") was placed on this sheet-shaped positive electrode, sufficiently impregnated with the solid electrolyte forming composition (III), and irradiated with active light rays to solidify the composition. Apart from the above, a negative electrode prepared by applying a 0.08 mm thick lithium to a 0.02 mm SUS substrate was applied to an external material of a PET/aluminum/polypropylene layered composite film. The solid electrolyte forming composition (III) was coated on the lithium, held between a pair of glass substrates, and irradiated with active light rays by a high pressure mercury arc lamp to solidify the composition, whereby the negative electrode and the solid electrolyte were composed. The above-mentioned positive electrode, the separator, and the negative electrode were overlaid to prepare a layered composite. The peripheral portion of the layered composite film was heat sealed, whereby a sheet-shaped battery with a size of 5 cm×7 cm was fabricated. This battery was charged up to 3.7 V with a constant current of 2.2 mA and then discharged with different currents. FIG. 3 shows the charge-discharge curves in this case.

EXAMPLE 6

A 0.3 mm thick aluminum was superimposed on a 0.1 mm thick lithium. This composite film was then heated, so that a lithium/aluminum alloy layered composite film was prepared. This was used as a negative electrode. The lithium/aluminum alloy surface of this negative electrode was impregnated with the solid electrolyte forming composition (I) and the composition was solidified. The procedure for Example 3 was repeated except that the negative electrode employed in Example 3 was replaced by the above prepared negative electrode, whereby a coin type battery (CR2016 type) was fabricated.

Performance Tests for the Batteries

The performance of each of the batteries fabricated in Examples 3, 4 and 6 was evaluated by conducting charging and discharging of each battery with a constant current of 0.5 mA. The results are shown in TABLE 1.

TABLE 1

| Examples | Open-circuit Voltage | Discharge Capacity (initial) | Discharge Capacity (after 30 cycles) |
|---|---|---|---|
| Example 3 | 3.7 V | 7.5 mAh | 7.0 mAh |
| Example 4 | 3.7 V | 12.5 mAh | 11.0 mAh |
| Example 6 | 3.2 V | 7.1 mAh | 6.5 mAh |

EXAMPLE 7

The formulation of the previously mentioned solid electrolyte forming composition (I) was modified in such a manner that the content of the electrolytic solution was changed to 69.1%, the content of the ethoxydiethylene glycol acrylate was changed to 29.6%, and the concentration of the electrolytic salt was changed to prepare a solid electrolyte forming composition (I') similar to the composition (I) was used. The composition (I') was placed in a beaker and irradiated with active light rays from a fluorescent lamp for 8 hours, and the properties of the obtained polymerization reaction product were investigated. The results are shown in TABLE 2.

TABLE 2

| Samples No. | Concentration of Electrolytic Salt (moles/l) | Properties of Polymerization Products | | |
|---|---|---|---|---|
| | | Ionic Conductivity | | |
| | | S/cm* | S/cm** | Form |
| 1 | 0.5 | — | — | Liquid |
| 2 | 1 | 5 × 10$^{-3}$ | 3.3 × 10$^{-3}$ | Viscoelastic Solid Material |
| 3 | 1.5 | 5 × 10$^{-3}$ | 3.3 × 10$^{-3}$ | Viscoelastic Solid Material |
| 4 | 2 | 4 × 10$^{-3}$ | 2.7 × 10$^{-3}$ | Viscoelastic Solid Material |
| 5 | 5 | 2 × 10$^{-3}$ | 1.3 × 10$^{-3}$ | Viscoelastic Solid Material |
| 6 | 7 | 1.5 × 10$^{-3}$ | 1.0 × 10$^{-3}$ | Viscoelastic Solid Material |
| 7 | 10 | 1.0 × 10$^{-3}$ | 0.7 × 10$^{-3}$ | Viscoelastic Solid Material |

EXAMPLE 8

The formulation of the previously mentioned solid electrolyte forming composition (II) was modified with the concentration of the electrolytic salt was changed to prepare a variety of solid electrolyte forming compositions. Each of the compositions was placed in a beaker and irradiated with active light rays from a fluorescent lamp for 8 hours, and the properties of the obtained polymerization reaction products were investigated. The results are shown in TABLE 3.

TABLE 3

| Samples No. | Concentration of Electrolytic Salt (moles/l) | Properties of Polymerization Products | | |
|---|---|---|---|---|
| | | Ionic Conductivity | | |
| | | S/cm* | S/cm** | Form |
| 1 | 0.5 | — | — | Liquid |
| 2 | 1.0 | 3 × 10$^{-3}$ | 2.0 × 10$^{-3}$ | Viscoelastic Solid Material |

TABLE 3-continued

| Samples No. | Concentration of Electrolytic Salt (moles/l) | Properties of Polymerization Products | | |
|---|---|---|---|---|
| | | Ionic Conductivity | | |
| | | S/cm* | S/cm** | Form |
| 3 | 2.0 | $2 \times 10^{-3}$ | $1.3 \times 10^{-3}$ | Viscoelastic Solid Material |
| 4 | 3.0 | $1.5 \times 10^{-3}$ | $1.0 \times 10^{-3}$ | Viscoelastic Solid Material |
| 5 | 4.0 | $1.0 \times 10^{-3}$ | $0.8 \times 10^{-3}$ | Viscoelastic Solid Material |
| 6 | 5.0 | $1.0 \times 10^{-3}$ | $0.7 \times 10^{-3}$ | Viscoelastic Solid Material |

EXAMPLE 9

0.5 moles of aniline was dissolved in 1000 parts of a 5.5N aqueous solution of $H_2SO_4$. By use of this solution, a polyaniline thin film was formed on a Nesa glass (1 cm×2 cm) with a surface resistance of 4Ω/□ with a constant potential of 0.8 V vs SCE and a charge quantity of 0.02 C/cm$^2$. The thus obtained polyaniline thin film was subjected to a predetermined reduction treatment to convert the same to a completely reduced polyaniline thin film. The polyaniline thin film was sufficiently dried to prepare a polyaniline electrode. By use of lithium for a counter electrode and for a reference electrode, together with the above electrode, a beaker type cell was fabricated. The solid electrolyte forming composition (V) was placed in this cell and irradiated with active light ray by use of a fluorescent lamp for 8 hours. The composition was completely solidified in a viscoelastic form, without fluidity, and was integrated with the electrode with remarkable adhesion. With the polyaniline electrode being used as a working electrode, the cyclic voltammetry was measured at potential sweep rates of 50 mV/sec and 20 mV/sec. From the voltammogram, it was confirmed that the solid electrolyte exhibits the same excellent doping characteristics as in the electrolytic solution. The ionic conductivity of the solid electrolyte was $1.7 \times 10^{-3}$ S/cm*, and $1.2 \times 10^{-3}$ S/cm**.

EXAMPLE 10

Polyaniline was synthesized in accordance with the method described in A. G. MacDiarmid et al., Conducting Polymers., 105 (1987) using ammonium persulfate and hydrochloric acid. The synthesized polyaniline was sufficiently subjected to a reduction treatment, so that white powder-like polyaniline was obtained. 75 parts of the white powder-like polyaniline and 25 parts of acetylene black were kneaded. By pressure forming, the kneaded mixture was formed into a disc-shaped positive electrode with a diameter of 14.5 mm and a thickness of 0.6 mm. This positive electrode was sufficiently impregnated with the solid electrolyte forming composition [IV], held between a pair of glass substrates and irradiated by active light rays by a high pressure mercury arc lamp, so that the solid electrolyte forming composition was solidified. A separator (Trademark "Juragurd 2502" made by Polyscience Co., Ltd.) was also sufficiently impregnated with the composition (I) in the same manner as mentioned above, held between a pair of glass substrates and irradiated by active light rays by a high pressure mercury acr lamp, so that the composition was solidified. As a negative electrode, a 0.1 mm thick lithium was employed. The above-mentioned positive electrode, the separator and the negative electrode were overlaid, whereby a coin type battery (CR2016 type) was fabricated.

EXAMPLE 11

A polyaniline film with a thickness of 0.1 mm was deposited on one side of a 0.02 mm thick, surface-roughened punched metal sheet made of SUS by a constant-current electrochemical polymerization using an aqueous solution containing 1 mol/l of aniline and 3 mol/l of $HBF_4$, with a constant current of 3 mA/cm$^2$. The thus obtained polyaniline film was subjected to a reduction treatment and sufficiently dried in vacuum. The film was then applied to an external material of a PET-/aluminum/polypropylene layered composite. The polyaniline film was sufficiently impregnated with the solid electrolyte forming composition (IV), held between a pair of glass substrates with the application of a pressure of 1 kg, and irradiated with active light rays by a high pressure mercury arc lamp, whereby a sheet-shaped positive electrode composed of a composite film of the positive electrode and a solid electrolyte was obtained. A separator ("Tonen Tapyrus P010SW-000") was placed on this sheet-shaped positive electrode, sufficiently impregnated with the solid electrolyte forming composition (IV), held between a pair of glass substrates, and irradiated with active light rays by a high pressure mercury arc lamp to solidify the composition. Apart from the above, a negative electrode prepared by applying a 0.1 mm thick lithium to a 0.02 mm SUS substrate was applied to an external material of a PET-/aluminum/polypropylene layered composite. The solid electrolyte forming composition (IV) was coated on the lithium, held between a pair of glass substrates, and irradiated with active light rays by a high pressure mercury arc lamp to solidify the composition, whereby the negative electrode and the solid electrolyte were composed. The above-mentioned positive electrode, the separator, and the negative electrode were overlaid to prepare a layered composite. The peripheral portion of the layered composite film was heat sealed, whereby a sheet-shaped battery with a size of 4 cm×5 cm was fabricated.

EXAMPLE 12

A 0.3 mm thick aluminum was superimposed on a 0.1 mm thick lithium. This composite film was then heated, so that a lithium/aluminum alloy layered composite film was prepared. This was used as a negative electrode. The lithium/aluminum alloy surface of this negative electrode was impregnated with the solid electrolyte forming composition (IV) and the composition was solidified. The procedure for Example 2 was repeated except that the negative electrode employed in Example 2 was replaced by the above prepared negative electrode, whereby a coin type battery (CR2016 type) was fabricated.

Performance Tests for the Batteries

The performance of each of the batteries fabricated in Examples 10 to 12 was evaluated by conducting charging and discharging of each battery with a constant current of 0.5 mA. The results are shown in TABLE 4.

TABLE 4

| Examples | Open-circuit Voltage | Discharge Capacity (initial) | Discharge Capacity (after 30 cycles) |
| --- | --- | --- | --- |
| Example 10 | 3.7 V | 7.4 mAh | 7.0 mAh |
| Example 11 | 3.7 V | 12.3 mAh | 10.9 mAh |
| Example 12 | 3.2 V | 7.2 mAh | 6.7 mAh |

EXAMPLE 13

The formulation of the previously mentioned solid electrolyte forming composition (IV) was modified in such a manner that the content of the electrolytic solution was changed to 69.1%, and the content of the furfuryl acrylate was changed to 29.6% to prepare a solid electrolyte forming composition (IV') similar to the composition (IV) was used. The composition (IV') was placed in a beaker and irradiated with active light rays from a fluorescent lamp for 8 hours, and the properties of the obtained polymerization reaction product were investigated. The results are shown in TABLE 5.

TABLE 5

| Samples No. | Concentration of Electrolytic Salt (moles/l) | Properties of Polymerization Products | | |
| --- | --- | --- | --- | --- |
| | | Ionic Conductivity | | |
| | | S/cm* | S/cm** | Form |
| 1 | 0.5 | — | — | Liquid |
| 2 | 1 | $5 \times 10^{-3}$ | $3.4 \times 10^{-3}$ | Viscoelastic Solid Material |
| 3 | 1.5 | $4.7 \times 10^{-3}$ | $3.1 \times 10^{-3}$ | Viscoelastic Solid Material |
| 4 | 2 | $4.2 \times 10^{-3}$ | $2.8 \times 10^{-3}$ | Viscoelastic Solid Material |
| 5 | 5 | $2.3 \times 10^{-3}$ | $1.5 \times 10^{-3}$ | Viscoelastic Solid Material |
| 6 | 7 | $1.4 \times 10^{-3}$ | $1.0 \times 10^{-3}$ | Viscoelastic Solid Material |
| 7 | 10 | $1.1 \times 10^{-3}$ | $0.7 \times 10^{-3}$ | Viscoelastic Solid Material |

EXAMPLE 14

The formulation of the previously mentioned solid electrolyte forming composition (V) was modified with the concentration of the electrolytic salt was changed to prepare a variety of solid electrolyte forming compositions. Each of the compositions was placed in a beaker and irradiated with active light rays from a fluorescent lamp for 8 hours, and the properties of the obtained polymerization reaction products were investigated. The results are shown in TABLE 6.

TABLE 6

| Samples No. | Concentration of Electrolytic Salt (moles/l) | Properties of Polymerization Products | | |
| --- | --- | --- | --- | --- |
| | | Ionic Conductivity | | |
| | | S/cm* | S/cm** | Form |
| 1 | 0.5 | — | — | Liquid |
| 2 | 1.0 | $2.8 \times 10^{-3}$ | $2.0 \times 10^{-3}$ | Viscoelastic Solid Material |
| 3 | 2.0 | $1.7 \times 10^{-3}$ | $1.3 \times 10^{-3}$ | Viscoelastic Solid Material |
| 4 | 3.0 | $1.7 \times 10^{-3}$ | $1.2 \times 10^{-3}$ | Viscoelastic Solid Material |
| 5 | 4.0 | $1.2 \times 10^{-3}$ | $1.0 \times 10^{-3}$ | Viscoelastic Solid Material |
| 6 | 5.0 | $1.0 \times 10^{-3}$ | $0.7 \times 10^{-3}$ | Viscoelastic Solid Material |

EXAMPLE 15

In 1000 parts of a non-aqueous solvent consisting of propylene carbonate and γ-butyrolactone with a weight ratio of 8:2, one mole of $LiBF_4$ was dissolved to prepare an electrolytic solution. 89.1% of this electrolytic solution, 6.5% of a polyene (a reaction product by allowing 400 parts of a polyoxyethylene glycol with a molecular weight of 400 to react with 342 parts of allylglycidyl ether), 3.6% of pentaerythritol tetrakisthioglycolate, 0.4% of methylbenzoylformate, and 0.5% of a silicone-alkylene oxide adduct were mixed, whereby a solid electrolyte formation composition (VI) was obtained.

An electrolytic manganese dioxide (EMD) having a β layer, acetylene black ("Denka Black"), and PTFE Dispersion (PJ-30 made by Mitsui Floro Chemical Co., Ltd.) were kneaded in a weight ratio of 7.5:2.0:0.5. By pressure forming, the kneaded mixture was formed into a disc with a diameter of 14.5 mm and a thickness of 0.6 mm. The thus formed disc was sufficiently dried with application of heat, impregnated with the above solid electrolyte formation composition (VI), held between a pair of glass substrates, and irradiated with active light rays to solidify the composition, whereby a positive electrode was obtained. By use of this positive electrode, and the separator and the negative electrode employed in Example 2, a coin type battery (CR2016 type) was fabricated.

EXAMPLE 16

The formulation of the previously mentioned solid electrolyte forming composition (VI) was modified with the concentration of the electrolytic salt was changed to prepare a variety of solid electrolyte forming compositions. Each of the compositions was placed in a beaker and irradiated with active light rays from a fluorescent lamp for 8 hours, and the properties of the obtained polymerization reaction products were investigated. The results are shown in TABLE 7.

TABLE 7

| Samples No. | Concentration of Electrolytic Salt (moles/l) | Properties of Polymerization Products | |
| --- | --- | --- | --- |
| | | Ionic Conductivity (S/cm*) | Form |
| 1 | 0.5 | — | Liquid |
| 2 | 1.0 | $5.5 \times 10^{-3}$ | Viscoelastic Solid Material |
| 3 | 2.0 | $5 \times 10^{-3}$ | Viscoelastic Solid Material |
| 4 | 3.0 | $4 \times 10^{-3}$ | Viscoelastic Solid Material |

TABLE 7-continued

| Samples No. | Concentration of Electrolytic Salt (moles/l) | Properties of Polymerization Products | |
|---|---|---|---|
| | | Ionic Conductivity (S/cm*) | Form |
| 5 | 4.0 | $3 \times 10^{-3}$ | Viscoelastic Solid Material |
| 6 | 5.0 | $2 \times 10^{-3}$ | Viscoelastic Solid Material |

EXAMPLE 17

A solid electrolyte forming composition with the following formulation was prepared:

| Toluene diisocyanate | 2.4 parts |
|---|---|
| Polyoxyalkylene polyol | 27.6 parts |
| Electrolytic solution | 70 parts |
| Catalyst (dibutyl tin laurate) | 0.1 parts |

As the above-mentioned polyoxyalkylene polyol, a polyol with a molecular weight of 3000 (m.p. 0° C. or less), prepared by addition polymerization of ethylene oxide/propylene oxide (=8/2 by weight ratio) to glycerin, was employed.

As the above-mentioned electrolytic solution, a solution of 3 moles/l of $LiBF_4$ dissolved in γ-butyrolactone was employed.

The above composition was placed in a beaker and heated to 50° C. for 1 hour, so that a polymerization reaction product was obtained and the properties thereof were investigated. The results are shown in TABLE 8.

TABLE 8

| Samples No. | Concentration of Electrolytic Salt (moles/l) | Properties of Polymerization Products | |
|---|---|---|---|
| | | Ionic Conductivity (S/cm*) | Form |
| 1 | 0.5 | $8 \times 10^{-2}$ | Liquid |
| 2 | 1 | $7.5 \times 10^{-3}$ | Viscoelastic Solid Material |
| 3 | 2 | $7 \times 10^{-3}$ | Viscoelastic Solid Material |
| 4 | 3 | $6 \times 10^{-3}$ | Viscoelastic Solid Material |
| 5 | 4 | $5 \times 10^{-3}$ | Viscoelastic Solid Material |
| 6 | 5 | $5 \times 10^{-3}$ | Viscoelastic Solid Material |

EXAMPLE 18

In 1000 parts of a non-aqueous solvent consisting of propylene carbonate and 1,2-dimethoxy ethane with a weight ratio of 6:4, three moles of $LiBF_4$ were dissolved to prepare an electrolytic solution. 79.2% of this electrolytic solution, 19.5% of hydroxyethyl acrylate, 0.8% of methylbenzoylformate, and 0.5% of a silicone-alkylene oxide adduct were mixed, whereby a solid electrolyte formation composition (VII) was obtained.

The formulation of the above-mentioned solid electrolyte forming composition (VII) was modified with the concentration of the electrolytic salt was changed to prepare a variety of solid electrolyte forming compositions. Each of the compositions was placed in a beaker and irradiated with active light rays from a fluorescent lamp for 8 hours, and the properties of the obtained polymerization reaction products were investigated. The results are shown in TABLE 9.

TABLE 9

| Samples No. | Concentration of Electrolytic Salt (moles/l) | Properties of Polymerization Products | |
|---|---|---|---|
| | | Ionic Conductivity (S/cm*) | Form |
| 1 | 0.5 | — | Liquid |
| 2 | 1.0 | $4.0 \times 10^{-3}$ | Viscoelastic Solid Material |
| 3 | 2.0 | $3.5 \times 10^{-3}$ | Viscoelastic Solid Material |
| 4 | 3.0 | $2 \times 10^{-3}$ | Viscoelastic Solid Material |
| 5 | 4.0 | $1.5 \times 10^{-3}$ | Viscoelastic Solid Material |
| 6 | 5.0 | $1.0 \times 10^{-3}$ | Viscoelastic Solid Material |

EXAMPLE 19

One part of trimethylol propane triacrylate was mixed with 64 parts of ethoxydiethylene glycol acrylate to prepare an unsaturated carboxylic acid ester mixture A. A non-aqueous solvent B was prepared by mixing propylene carbonate and 1,2-dimethoxyethane with a weight ratio of 8:2. The mixture A, the non-aqueous solvent B and $LiBF_4$ (electrolytic salt) were mixed to prepare the compositions with the following formulations. Each of the compositions was placed in a beaker and irradiated with active light rays by a high pressure mercury arc lamp for 1 hour. The modulus of elasticity and the elongation of each of the thus obtained polymerization reaction products were measured. The results are shown in TABLE 10. Methylbenzoyl formate was used as the polymerization initiator. The measurement of the elongation of the solid electrolytes was conducted for solid electrolytes with a size of 1 cm × 1 cm × 0.3 cm.

TABLE 10

| Composition of Reaction Liquid | | | Properties of Solid Electrolyte | | |
|---|---|---|---|---|---|
| Mixture A part(s) | Electrolytic Salt (part(s)) | Non-aqueous Solvent B (part(s)) | Modulus of Elasticity (dyne/cm²) | Elongation (%) | Ionic Conductivity (S/cm*) |
| 1.3 | 2.0 | 6.7 | $2.5 \times 10^3$ | 95 | $4 \times 10^3$ |
| 2.0 | 1.8 | 6.2 | $1.5 \times 10^4$ | 60 | $3.5 \times 10^3$ |
| 2.5 | 1.0 | 6.5 | $8 \times 10^3$ | 50 | $4 \times 10^3$ |
| 1.2 | 2.6 | 6.2 | $3 \times 10^3$ | 120 | $3 \times 10^3$ |
| 1.2 | 1.9 | 6.9 | $6 \times 10^2$ | 150 | $4 \times 10^3$ |
| 1.2 | 1.3 | 7.5 | — | — | — |
| 2.4 | 0.6 | 7.0 | $1 \times 10^3$ | 45 | $8 \times 10^3$ |
| 2.0 | 1.2 | 6.8 | $1 \times 10^4$ | 70 | $4 \times 10^3$ |
| 2.0 | 2.2 | 5.8 | $5 \times 10^4$ | 35 | $1.5 \times 10^3$ |
| 2.0 | 3.0 | 5.0 | $9 \times 10^4$ | 30 | $0.9 \times 10^3$ |
| 2.5 | 3.0 | 4.5 | $1 \times 10^5$ | 20 | $0.6 \times 10^3$ |
| 3.5* | 2.5 | 4.0 | $7 \times 10^5$ | 15 | $0.1 \times 10^3$ |

*shows Comparative Example.

COMPARATIVE EXAMPLE 1

100 parts of a polyethylene oxide triol with a molecular weight of 3000, 0.06 parts of dibutyl tin dilaurate, 8.5 parts of toluene-2,4-diisocyanate, and 5.4 parts of $LiBF_4$ were dissolved in 100 parts of methyl ethyl ketone, whereby a composition (a) was obtained.

The procedure for Example 10 was repeated except that the solid electrolyte forming composition (I) employed in Example 10 was replaced by the composition (a) and that the solid electrolyte was formed by heating at 80° C. for 3 days, whereby a battery was fabricated.

COMPARATIVE EXAMPLE 2

The procedure for Example 4 was repeated except that the solid electrolyte forming composition (I) employed in Example 4 was replaced by the composition (a) and that the solid electrolyte was formed by heating at 80° C. for 3 days, whereby a battery was fabricated.

The performance of each of the batteries fabricated in Comparative Examples 1 and 2 was evaluated by conducting charging and discharging of each battery with a constant current of 0.5 mA. The results are shown in TABLE 11.

TABLE 11

| Examples | Open-circuit Voltage | Discharge Capacity (initial) | Discharge Capacity (after 30 cycles) |
|---|---|---|---|
| Comp. Ex. 1 | 3.7 V | 2.0 mAh | 0.5 mAh |
| Comp. Ex. 2 | 3.2 V | 2.2 mAh | 0.6 mAh |

COMPARATIVE EXAMPLE 3

0.25 parts of methoxypolyethylene glycol monoacrylate (m.w. 496), 0.75 parts of polyethylene glycol dimethacrylate (m.w. 550), 0.08 parts of lithium perchlorate, and 0.004 parts of 2,2-dimethoxy-2-phenylacetophenone were mixed to prepare a uniform solution. This liquid composition was thinly extended on a laboratory dish made of aluminum and irradiated with a super high pressure mercury arc lamp in an atmosphere of nitrogen, whereby a solid electrolyte film free from solvents was obtained. The ionic conductivity of this film was $3.7 \times 10^{-7}$ S/cm*. A mixed solvent of propylene carbonate and 1,2-dimethoxy ethane (6:4 by weight ratio) was contained in this film to prepare a solid electrolyte (the content of the electrolytic solution: 108%). The ionic conductivity of this solid electrolyte was $2.0 \times 10^{-4}$ S/cm*. The electrolytic solution oozed from the surface of the solid electrolyte. When this solid electrolyte was held between two electrodes and pressure was applied thereto in order to use the solid electrolyte as a solid electrolyte for a battery, the solid electrode was broken and the battery did not work.

A battery which contains the solid electrolyte of the present invention has a high ionic conductivity because the solid electrolyte is composed of a viscoelastic polymer containing a large amount of an electrolytic solution, and the electrolytic solution does not leak. Furthermore, since the inside of the battery does not dry, and there is no imbalanced presence of the electrolytic solution, and it does not occur that the separator is partially dried, there is no increase in the internal impedance. Therefore, in the present invention, no internal short circuits occur, so that highly reliable batteries and high voltage thin batteries can be obtained. Therefore the present invention can significantly contribute to the reduction of the weight and size of electric appliances.

The solid electrolyte of the present invention can be used not only in batteries, but also in condensers, capacitors, sensors and equipment for use with organisms, such as electrodes for electrocardiography, contacts for ultrasonography, and pads for fulguration, and electrochromic devices, and can greatly contribute to the reduction of the weight and size of such electric appliances.

What is claimed is:

1. A solid electrolyte comprising a viscoelastic material, wherein said viscoelastic material comprises a polymerized material and a non-aqueous electrolytic solution which is contained in said polymerized material, said electrolytic solution being present in an amount of 200 wt. % or more of said polymerized material.

2. A solid electrolyte comprises a viscoelastic material, wherein said viscoelastic material comprises a polymerized material and a non-aqueous electrolytic solution which is contained in said polymerized material, the content of said non-aqueous electrolytic solution being 200 wt. % or more of said polymerized material, said viscoelastic material having a modulus of elasticity of $10^2$ to $10^5$ dyne/cm$^2$, and an elongation of 20% or more.

3. The solid electrolyte as claimed in claim 1 or claim 2, wherein said polymerized material is a polymer of an unsaturated carboxylic acid ester, a polymer of a mixture of polyene/polythiol, or a polyurethane.

4. A solid electrolyte comprising a viscoelastic material, wherein said viscoelastic material comprises a polymerized material of an acrylate having a molecular weight of 500 or less represented by formula (I), or a polymerized material of an unsaturated carboxylic acid ester comprising, as the main component, said acrylate of formula (I), and a non-aqueous electrolytic solution comprising an electrolytic salt and a non-aqueous solvent which is contained in said polymerized material, the content of said non-aqueous electrolytic solution being 200 wt. % or more of said polymerized material, and said electrolytic salt being present in a ratio of 1.0 mole/l or more in said non-aqueous electrolytic solution:

wherein $R_1$ represents a hydrogen atom, or a methyl group, $R_2$ represents a hydrocarbon group or a group containing a heterocyclic ring, and n is an integer of 1 or more.

5. A solid electrolyte comprising a viscoelastic material, wherein said viscoelastic material comprises a polymerized material of a compound of formula (II), or a polymerized material of an unsaturated carboxylic acid ester comprising, as the main component, said compound of formula (II), and a non-aqueous electrolytic solution comprising an electrolytic salt and a non-aqueous solvent which is contained in said polymerized material, the content of said non-aqueous electrolytic solution being 200 wt. % or more of said polymerized material, and said electrolytic salt being present in a ratio of 1.0 mole/l or more in said non-aqueous electrolytic solution:

$$CH_2=\underset{\underset{R_3}{|}}{C}COOR_4 \quad (II)$$

wherein $R_3$ represents a hydrogen atom, or a methyl group, and $R_4$ represents a group containing a heterocyclic ring.

6. The solid electrolyte as claimed in any of claims 1, 2, 4 or 5, wherein the content of said non-aqueous electrolytic solution is 400 to 900 wt. %.

7. The solid electrolyte as claimed in any of claims 1, 2, 4, or 5, wherein the concentration of said electrolytic salt is 2 to 5 moles/l.

8. The solid electrolyte as claimed in claim 4 or claim 5, wherein said unsaturated carboxylic acid ester comprises a polyfunctional unsaturated carboxylic acid ester having two or more (meth)acryloyl groups.

9. The solid electrolyte as claimed in claim 8, wherein said polyfunctional unsaturated carboxylic acid ester is present with a ratio of 0.05 to 2 wt. % of said non-aqueous electrolytic solution.

10. An electrochemical device comprising a solid electrolyte, wherein said solid electrolyte is any of said solid electrolytes as claimed in claims 1, 2, 4 or 5.

11. The electrochemical device as claimed in claim 10, wherein at least one part of the constituent elements of said electrochemical device and said solid electrolyte are composed.

12. A battery comprising any of said solid electrolytes as claimed in claim 1, 2, 4 or 5.

13. A battery comprising electrodes, a separator and a solid electrolyte, wherein said solid electrolyte is any of said solid electrolytes as claimed in claim 1, 2, 4 or 5, wherein said electrode, said separator and said electrolyte are integrally composed.

14. A method of fabricating a solid electrolyte comprising the step of dissolving 100 parts of a compound of formula (I) or formula (II), or an unsaturated carboxylic acid ester comprising said compound of formula (I) or formula (II) as the main component, in 200 or more parts of a non-aqueous electrolytic solution having a concentration of electrolytic salt therein of 1.0 mole/l or more, in the presence of a polymerization initiator, and conducting a polymerization reaction to produce a viscoelastic polymer:

$$CH_2=CHCOO(CH_2CHO)_nR_2 \quad (I)$$
$$\underset{R_1}{|}$$

wherein $R_1$ represents a hydrogen atom, or a methyl group, $R_2$ represents a hydrocarbon group or a group containing a heterocyclic ring, and n is an integer of 1 or more; and $$CH_2=\underset{\underset{R_3}{|}}{C}COOR_4 \quad (II)$$

wherein $R_3$ represents a hydrogen atom, or a methyl group, and $R_4$ represents a group containing a heterocyclic ring.

* * * * *

UNITED STATES PATENT AND TRADEMARK OFFICE
CERTIFICATE OF CORRECTION

PATENT NO. : 5,223,353
DATED : June 29, 1993
INVENTOR(S) : Ohsawa et al

It is certified that error appears in the above-indentified patent and that said Letters Patent is hereby corrected as shown below:

Column 1, line 46, "In order to improved" should read --In order to improve--.

Column 5, line 59, "the polyfunctional the polyfunctional" should read --the polyfunctional--.

Column 10, line 9: "thermal polymerizable" should read --thermally polymerizable--.

Column 11, line 10: "auxiliary exceed" should read --auxiliary exceeds--.

Column 15, line 1: "chalcognite" should read --chalcogenite--.

Column 17, line 10: "-butyrolactone" should read --T-butyrolactone--.

UNITED STATES PATENT AND TRADEMARK OFFICE
CERTIFICATE OF CORRECTION

PATENT NO. : 5,223,353
DATED : June 29, 1993
INVENTOR(S) : Ohsawa et al

It is certified that error appears in the above-indentified patent and that said Letters Patent is hereby corrected as shown below:

Column 17, line 49: "solution of H" should read --solution of $H_2SO_4$--.

Column 18, line 29: "acr lamp" should read --arc lamp--.

Column 21, line 60: "[IV]" should read --(IV)--.

Column 21, line 68: "acr" should read --arc--.

Column 24, line 23: "6.5%" should read --6.4%--.

Column 26, line 57 - 66, Table 10, Ionic Conductivity column "$10^3$ should read --$10^{-3}$--, all occurrences.

Column 28, line 19: "A solid electrolyte comprises" should read --A solid electrolyte comprising--.

Signed and Sealed this

Eighteenth Day of October, 1994

BRUCE LEHMAN

Attest:

Attesting Officer

Commissioner of Patents and Trademarks